US012720192B2

(12) United States Patent
Jonsson et al.

(10) Patent No.: US 12,720,192 B2
(45) Date of Patent: Aug. 25, 2026

(54) PEOPLE DETECTOR FOR DETECTING WHEN PEOPLE PASS THROUGH A DOORWAY

(71) Applicant: ASSA ABLOY AB, Stockholm (SE)

(72) Inventors: Tomas Jonsson, Rönninge (SE); Anders Sahlström, Stockholm (SE); Mats Cederblad, Stockholm (SE)

(73) Assignee: ASSA ABLOY AB, Stockholm (SE)

( * ) Notice: Subject to any disclaimer, the term of this patent is extended or adjusted under 35 U.S.C. 154(b) by 0 days.

(21) Appl. No.: 19/119,901

(22) PCT Filed: Oct. 30, 2023

(86) PCT No.: PCT/EP2023/080233
§ 371 (c)(1),
(2) Date: Apr. 10, 2025

(87) PCT Pub. No.: WO2024/094620
PCT Pub. Date: May 10, 2024

(65) Prior Publication Data

US 2026/0095651 A1 Apr. 2, 2026

(30) Foreign Application Priority Data

Nov. 4, 2022 (SE) .................................... 2251285-9

(51) Int. Cl.
*H04N 23/61* (2023.01)
*G06V 10/26* (2022.01)
(Continued)

(52) U.S. Cl.
CPC ......... *H04N 23/651* (2023.01); *G06V 10/273* (2022.01); *G06V 20/52* (2022.01);
(Continued)

(58) Field of Classification Search
CPC .... H04N 23/651; H04N 23/61; H04N 23/667; H04N 7/181; G06V 20/52; G06V 10/273; G06V 40/25
See application file for complete search history.

(56) References Cited

U.S. PATENT DOCUMENTS 9,367,733 B2 * 6/2016 Zhu ........................ G06V 10/46
11,546,514 B1 * 1/2023 Brading ................ H04N 7/188
(Continued)

FOREIGN PATENT DOCUMENTS

GB 2584619 A 12/2020
WO WO-2022175395 A1 8/2022
WO WO-2024094620 A1 5/2024

OTHER PUBLICATIONS

"PCT EP 2023080233 IPRP mailed Sep. 10, 2024", 17 pages.
(Continued)

*Primary Examiner* — Brian P Yenke
(74) *Attorney, Agent, or Firm* — Schwegman Lundberg & Woessner, P.A.

(57) ABSTRACT

It is provided a people detector (1) for detecting when people pass through a doorway. The people detector (1) comprises: a first image source (11); a second image source (12): a processor (60); and a memory (64) storing instructions (67) that, when executed by the processor, cause the people detector (1) to: receive a first stream of images from the first image source (11); determine, based on the first stream of images, a confidence indicator that a single person passes through the doorway; when the confidence indicator indicates confidence, determine that a single person has passed through the doorway; and when the confidence indicator indicates non-confidence, receive a second stream of images from the second image source (12), and determine, based on the second stream of images, how many people has passed through the doorway.

17 Claims, 6 Drawing Sheets

(51) Int. Cl.

| | |
|---|---|
| ***G06V 20/52*** | (2022.01) |
| ***G06V 40/20*** | (2022.01) |
| ***H04N 7/18*** | (2006.01) |
| ***H04N 23/65*** | (2023.01) |
| ***H04N 23/667*** | (2023.01) |

(52) U.S. Cl.

CPC ............. *G06V 40/25* (2022.01); *H04N 7/181* (2013.01); *H04N 23/61* (2023.01); *H04N 23/667* (2023.01)

(56) References Cited

U.S. PATENT DOCUMENTS

| | | | | |
|---|---|---|---|---|
| 11,798,340 | B1 * | 10/2023 | Xu | G07C 9/30 |
| 12,430,974 | B2 * | 9/2025 | Ming | G06V 10/82 |
| 2005/0093697 | A1 * | 5/2005 | Nichani | G07C 9/00 340/545.1 |
| 2007/0092143 | A1 * | 4/2007 | Higgins | G06V 20/54 382/104 |
| 2008/0118161 | A1 * | 5/2008 | Liu | G06F 18/2411 382/228 |
| 2010/0195899 | A1 * | 8/2010 | Nc | G06V 40/103 382/218 |
| 2013/0038694 | A1 | 2/2013 | Nichani et al. | |
| 2014/0139633 | A1 | 5/2014 | Wang et al. | |
| 2014/0270358 | A1 * | 9/2014 | Zhu | G06F 18/217 382/103 |
| 2014/0277757 | A1 | 9/2014 | Wang et al. | |
| 2017/0220872 | A1 * | 8/2017 | Child | G08B 13/196 |
| 2017/0277957 | A1 * | 9/2017 | Tonoike | G06T 7/20 |
| 2017/0278014 | A1 * | 9/2017 | Lessmann | G06T 5/20 |
| 2018/0129885 | A1 * | 5/2018 | Potter | G08B 3/10 |
| 2019/0147676 | A1 | 5/2019 | Madzhunkov et al. | |
| 2019/0360714 | A1 | 11/2019 | Konrad et al. | |
| 2020/0089967 | A1 | 3/2020 | Velipasalar et al. | |
| 2020/0314651 | A1 * | 10/2020 | Pirch | G07C 9/00309 |
| 2020/0374491 | A1 * | 11/2020 | DeAngelus | G06V 10/22 |
| 2023/0018515 | A1 * | 1/2023 | Nakahara | G06V 20/64 |
| 2023/0133854 | A1 * | 5/2023 | Vaezi Joze | G06F 18/2163 348/222.1 |
| 2023/0230382 | A1 * | 7/2023 | Stewart | G06V 10/98 382/103 |
| 2023/0360457 | A1 * | 11/2023 | Hartman | G07C 9/25 |
| 2024/0144692 | A1 * | 5/2024 | Jonsson | E05F 15/73 |
| 2025/0200937 | A1 * | 6/2025 | Toca | G06V 10/764 |
| 2025/0304009 | A1 * | 10/2025 | Yamamoto | B60R 25/25 |
| 2026/0051139 | A1 * | 2/2026 | Bezen | G06V 10/25 |

OTHER PUBLICATIONS

"PCT EP 2023080233 ISR mailed Feb. 5, 2024", 6 pages.

"PCT EP 2023080233 Written Opinion mailed Feb. 5, 2024", 11 pages.

"SE Patent application No. 2251285-9 Office Action mailed Jun. 2, 2023", 9 pages.

Cokbas, Mertcan, et al., "Low-Resolution Overhead Thermal Tripwire for Occupancy Estimation", 2020 IEEE/CVF Conference on Computer Vision and Pattern Recognition Workshops (CVPRW), (Jun. 2020), 9 pages.

Fu, Huiyuan, et al., "Real-time 1-20 accurate crowd counting based on RGB-D information", 19th IEEE International Conference on Image Processing, (Sep. 2012), 4 pages.

Lu, Hao, et al., "A Zone-Level Occupancy Counting System for Commercial Office Spaces Using Low-Resolution Time-of-Flight Sensors", Energy & Buildings, vol. 252, id. 111390, (Dec. 2021), 31 pages.

Stec, Michal, et al., "Using Time-of-Flight Sensors for People Counting Applications", 2019 Conference on Design and Architectures for Signal and Image Processing (DASIP), (Oct. 2019), 6 pages.

* cited by examiner

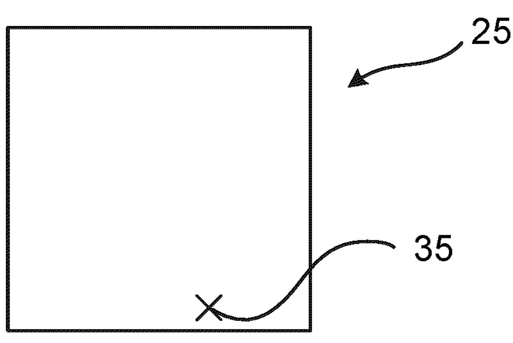
Fig. 4A
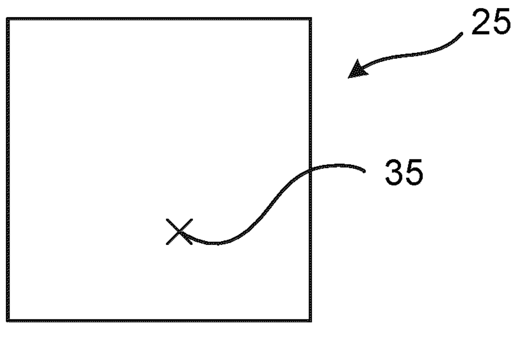
Fig. 4B
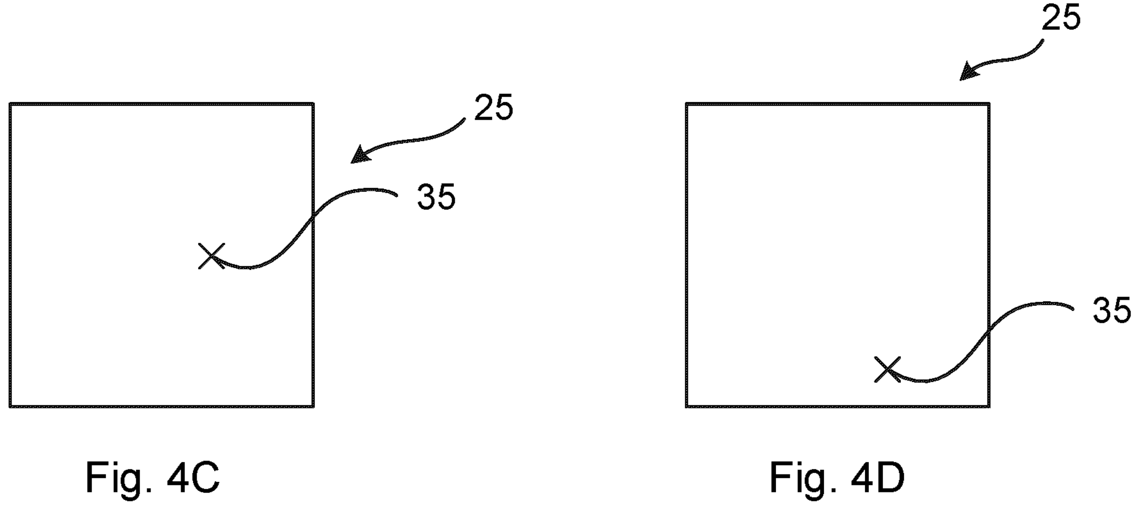
Fig. 4C
Fig. 4D

PEOPLE DETECTOR FOR DETECTING WHEN PEOPLE PASS THROUGH A DOORWAY

CROSS-REFERENCE TO RELATED APPLICATION(S)

This application is a national stage application under 35 U.S.C. § 371 of PCT Appl. No. PCT/EP2023/080233, titled "People Detector for Detecting When People Pass Through a Doorway," filed Oct. 30, 2023, which claims priority to Swedish Patent Appl. No. 2251285-9, filed Nov. 4, 2022, each of which is incorporated herein by reference in its entirety.

TECHNICAL FIELD

The present disclosure relates to the field of people detectors and in particular to a people detector for detecting when people pass through a doorway of a door by which the people detector is installed.

BACKGROUND

People detectors can be used in many different environments. For instance, people detectors can be used to detect flows of people e.g. in a theme park or a shopping centre. People detectors can also be used to count people in a certain space, such as commercial or residential properties, which can then be used to control Heat, Ventilation and Air Conditioning (HVAC) or for keeping track of the number of people in a certain space, e.g. for fire protection purposes or office utilisation metrics.

There are people detectors that provide good accuracy, e.g. based on conventional digital cameras, but these are quite costly and require significant amount of power.

Power use is of great importance. If a people detector can be provided that is both power efficient and accurate, this makes the installation easier since such a people detector can be battery powered, reducing or eliminating the need for cumbersome and expensive wiring.

SUMMARY

One object is to provide a power efficient, yet accurate, people counter.

According to a first aspect, it is provided a people detector for detecting when people pass through a doorway of a door by which the people detector is installed. The people detector comprises: a first image source; a second image source; a processor; and a memory storing instructions that, when executed by the processor, cause the people detector to: receive a first stream of images from the first image source; determine, based on the first stream of images, a confidence indicator that a single person passes through the doorway; when the confidence indicator indicates confidence, determine that a single person has passed through the doorway; and when the confidence indicator indicates non-confidence, receive a second stream of images from the second image source, the second stream of images at least partly overlapping the first stream of images in time, and determine, based on the second stream of images, how many people has passed through the doorway, wherein people detection based on the second stream of images consumes more energy than people detection based on the first stream of images by the second image source 12 having a greater resolution than the first image source 11.

Each image in the first stream of images may comprise depth data, in which case the instructions to determine the confidence indicator comprise instructions that, when executed by the processor, cause the people detector to, for each image in the first stream of images, fit a two-dimensional distribution function, and determine the confidence indicator based on how similar the two-dimensional distribution function is to the image.

The instructions to determine the confidence indicator may comprise instructions that, when executed by the processor, cause the people detector to, for each image in the first stream of images, remove pixels that depict the door prior to fitting the two-dimensional distribution function.

The first image source may be a time-of-flight camera, in which case each image in the first stream of images comprises a matrix of pixels, where each pixel comprises a depth value.

The instructions to determine the confidence indicator may comprise instructions that, when executed by the processor, cause the people detector to, for each image in the first stream of images, determine a centre of mass, compare a movement of the centre of mass from a previous image in the first stream of images, and determine the confidence indicator based on the movement.

The instructions to determine the confidence indicator may comprise instructions that, when executed by the processor, cause the people detector to determine that the confidence indicator indicates non-confidence when the centre of mass changes direction.

The instructions to determine the confidence indicator may comprise instructions that, when executed by the processor, cause the people detector to determine that the confidence indicator indicates non-confidence when there is more than one depth minimum in the first stream of image.

The first image source may comprise images from two sensors, in which case the first stream of images is based on two sub-streams from the two sensors, respectively.

The people detector may be configured to transition from a dormant state to an active state based on receiving a signal indicating proximity of a person.

According to a second aspect, it is provided a method for detecting when people pass through a doorway of a door by which a people detector is installed. The method is performed by a people detector. The method comprises: receiving a first stream of images from a first image source; determining, based on the first stream of images, a confidence indicator that a single person passing through the doorway; when the confidence indicator indicates confidence, determining that a single person has passed through the doorway; and when the confidence indicator indicates non-confidence, receiving a second stream of images from the second image source, the second stream of images at least partly overlapping the first stream of images in time, and determine, based on the second stream of images, how many people has passed through the doorway, wherein people detection based on the second stream of images consumes more energy than people detection based on the first stream of images by the second image source 12 having a greater resolution than the first image source 11.

Each image in the first stream of images may comprise depth data, in which case the determining the confidence indicator comprises, for each image in the first stream of images, fitting a two-dimensional distribution function, and determining the confidence indicator based on how similar the two-dimensional distribution function is to the image.

The determining the confidence indicator may comprise, for each image in the first stream of images, removing pixels that depict the door prior to fitting the two-dimensional distribution function.

The first image source may be a time-of-flight camera, in which case each image in the first stream of images comprises a matrix of pixels, where each pixel comprises a depth value.

The determining the confidence indicator may comprise, for each image in the first stream of images, determining a centre of mass, comparing a movement of the centre of mass from a previous image in the first stream of images, and determining the confidence indicator based on the movement.

The determining the confidence indicator may comprise determining that the confidence indicator indicates non-confidence when the centre of mass changes direction.

Each image in the first stream of images may comprise depth data, in which case the determining the confidence indicator comprises determining that the confidence indicator indicates non-confidence when there are more than one depth minimum in the first stream of image.

The first image source may comprise images from two sensors, in which case the first stream of images is based on two sub-streams from the two sensors, respectively.

The method may further comprise: receiving a proximity signal indicating proximity of a person; and transitioning from a dormant state to an active state based on the proximity signal.

According to a third aspect, it is provided a computer program for detecting when people pass through a doorway of a door by which a people detector is installed. The computer program comprises computer program code which, when executed on the people detector causes the people detector to: receive a first stream of images from a first image source; determine, based on the first stream of images, a confidence indicator that a single person passing through the doorway; when the confidence indicator indicates confidence is greater than a threshold, determine that a single person has passed through the doorway; and when the confidence indicator indicates non-confidence is less than the threshold, receive a second stream of images from the second image source, the second stream of images at least partly overlapping the first stream of images in time, and determine, based on the second stream of images, how many people has passed through the doorway, wherein people detection based on the second stream of images consumes more energy than people detection based on the first stream of images by the second image source 12 having a greater resolution than the first image source 11.

According to a fourth aspect, it is provided a computer program product comprising a computer program according to the third aspect and a computer readable means comprising non-transitory memory in which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIGS. 4A-D depict schematic graphs illustrating scenarios where movement is consistent and inconsistent of someone passing through the doorway;

DETAILED DESCRIPTION

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein provide a way to detect people passing through a doorway based on (at least) two image sources. The first image source is a low-power image source with relatively low accuracy. The second image source is a higher-power image source with relatively high accuracy. The first image source is used in a primary detection, and if a single person (or no person) passing through can be determined based on the first image source, with sufficient confidence, no more people detection is needed for the event. On the other hand, if the confidence is low, the second image source is employed in a secondary detection to detect the number of people passing through the doorway. In this way, the low-power primary detection is used when sufficiently accurate, and the high-power secondary detection is only used when needed. This gives an accurate people detection with less power use than the prior art.

Figure 1:
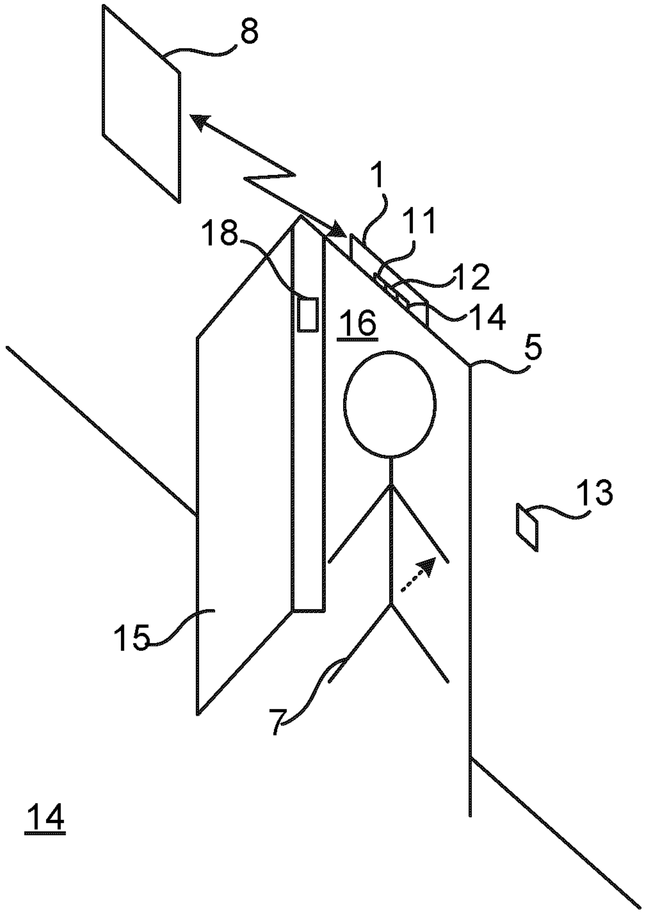
FIG. 1 is a schematic diagram illustrating an environment in which embodiments presented herein can be applied.

FIG. 1 is a schematic diagram illustrating an environment in which embodiments presented herein can be applied. Access between a first physical space 14 and a second physical space 16 is restricted by a door 15 which can be closed or open. The door 15 can be any type of door (e.g. swing, sliding, roller) and is provided in a doorway 5 between the first physical space 14 and a second physical space 16. In order to control access in either or both direction between the physical spaces 14, 16 a lock device 13 can be provided to selectively unlock and lock the door 15. The opening status of the door 15, e.g. open or closed, can be detected by an optional door sensor 18. The door sensor 18 can be provided in the door frame (as shown), in the door 15, using sections in both the door frame and the door, in hinges, in a door closer (not shown) or in a door opener. The door sensor 18 can detect the opening status of the door 15 in any suitable manner e.g. using a magnetometer and magnet, magnetic rotary position sensor, using electrical resistance, using impedance, using visual sensing or using an accelerometer and/or gyro.

A people detector 1 is installed by the door 15, in this case in the doorway 5. The people detector 1 can be a separate device, or it can be installed in a door closer, door opener, in an electronic lock, in a credential reader or an EAC (Electronic Access Control) button for unlocking or opening the door. The people detector 1 comprises a first image source 11 and a second image source 12, which are both directed to detect any people passing through the doorway 5. In this way, the people detector can detect when someone enters the first physical space 14 from the second physical space 16 and vice versa. Optionally, a proximity sensor 14 is provided, internal to the people sensor 1 or external to the people sensor 1. The proximity sensor can e.g. be an ultrasound sensor, a passive infrared sensor or a radar.

The image sources 11, 12 can e.g. be based on capturing images of the space by the doorway in two dimensions (2D) or three dimensions (3D), e.g. based on Time-of-Flight (ToF) detection, visual imaging (i.e. a camera), infrared detection, thermal detection, lidar, radar, etc. It is to be noted that the term 'image' is to be interpreted broadly as any captured representation of the local physical environment. Hence, the image can be represented as a 2D array of pixels, a 2D array of pixels with depth data added for each pixel, a point cloud (in 3D space), a set of polygons in 3D space, etc.

The number of images that are captured can be relatively low and still work well for the purpose of people detection. For instance, 4-5 images from a camera can be sufficient when the capture rate of the first image source is in the region of 15-30 Hz.

One difference between the first image source 11 and the second image source 12 is that the second image source 12, when in use, consumes more energy, per unit of time, than the first image source 11. In other words, the first image source 11 is more power efficient than the second image source 12. Furthermore, the second image source 12 enables more accurate detection of one or more people passing through the doorway 5 compared to the first image source 11. This improved accuracy of detection based on the second image source 12, at the cost of more energy use, can e.g. be achieved by having a greater resolution than the first image source 11. The increased energy use for the second image source can be due to increased need for processing, e.g. of more pixels of the higher resolution of the second image source 12. In one embodiment, the first images source 11 and second image source 12 are based on the same hardware that provides a lower-resolution image as the first image source 11 and a higher-resolution image as the second image source 12. In one embodiment, the first images source 11 and second image source 12 are based on the same image capturing hardware but the second image source 12 is based on a lighting source being active, resulting in the second image source 12 thus consuming more energy.

In one embodiment, the first image source 11 provides images of very low resolution, e.g. 40×30, 8×8 or 4×4 pixels, and the second image source 12 provides images of slightly higher resolution, e.g. 128×128 or 256×256 pixels. Even with the first image source 11 having such very low resolution, this is sufficient to in many cases detect presence of people, as described in more detail below. Moreover, the fewer pixels to process, the less power is needed for the processing to detect people. When needed, using the (relatively) higher-resolution second image source 12, while more power is used, a more accurate detection of one or more people passing through the doorway is achieved.

The slightly higher resolution of the second image source 12 is employed only when a confidence indicator indicates low confidence that the first image source 11 captures a single person walking through the doorway 5. In this way, when the people counter 1 is relatively confident (e.g. in comparison with a threshold), based on the first image source 11, that a single person has walked through the doorway 5, this is recorded without having to use the more accurate but more power consuming second image source 12.

Using a stream of multiple images from the first image source 11 and, when needed, the second image source 12, the people detector 1 is thus capable of detecting when a person 7 moves from the first physical space 14 to the second physical space 16 (and vice versa). The number of people passing through can also be detected. This can be utilised when an intruder attempts to enter a restricted physical space by passing right after a person with legitimate access, a procedure which is also known as piggybacking or tailgating.

The detection of a person 7, and optionally a direction of movement, is recorded by the people detector 1 and the people detector 1 can communicate this information to an external device 8. The external device 8 can be an alarm system, a building automation system or any other suitable device. The external device 8 can be at the same site as the people detector 1 or it can be remotely located.

The external device 8 can use the people detection information to determine e.g. how many people are in the first physical space 14 and/or the second physical space 16. This information can be used by the external device 8 e.g. to control ventilation, heating, cooling and/or lighting. Moreover, this information can be used for office utilisation metrics, e.g. enabling personnel to plan when to go to the office (rather than working from home) when utilisation is low. Alternatively or additionally, the people detection information can be used if an emergency occurs, to know where people are located and how many people there are to evacuate. Alternatively or additionally, this information can be used for people flow statistics, e.g. for theme parks, public transport stations, and shops.

When there is only one doorway to a physical space (e.g. a room, office or home), the people detector 1 can thus be used count how many people are in the physical space at any point in time. When there are multiple doorways to a physical space, each doorway can be provided with a people detector. This enables the external device to keep track of the number of people in the physical space by detecting each time someone enters or exits through any of the doorways.

A physical space (for which the number of people is kept track of) can be any type of space where people can be present. Hence, the physical space can be any one or more of a room, a set of rooms (e.g. an office), a home, a shop, an arena, a theme park, a section of an outside space, or any other commercial, public or residential space.

Optionally, physical spaces are arranged in a hierarchy, such that several physical spaces are represented collectively by an access zone, e.g. in an office environment. In this way, the external device 8 can keep track of the number of people in each physical space (e.g. room) and also in the combined access zone (e.g. an office building). The number of people in each access zone (based on the people counting) can be compared with the number of persons having entered using the access control system, which can thereby be used to detect the occurrence of piggybacking.

Figure 2A:
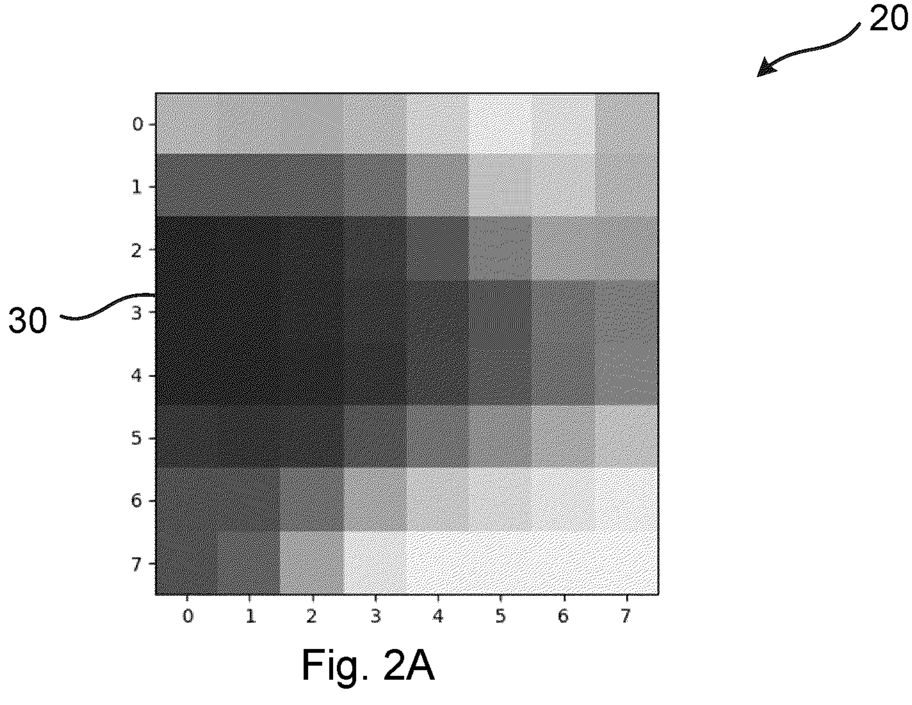
FIGS. 2A-B depict schematic images illustrating a situation when a single person passes through the doorway of FIG. 1.
Figure 2B:
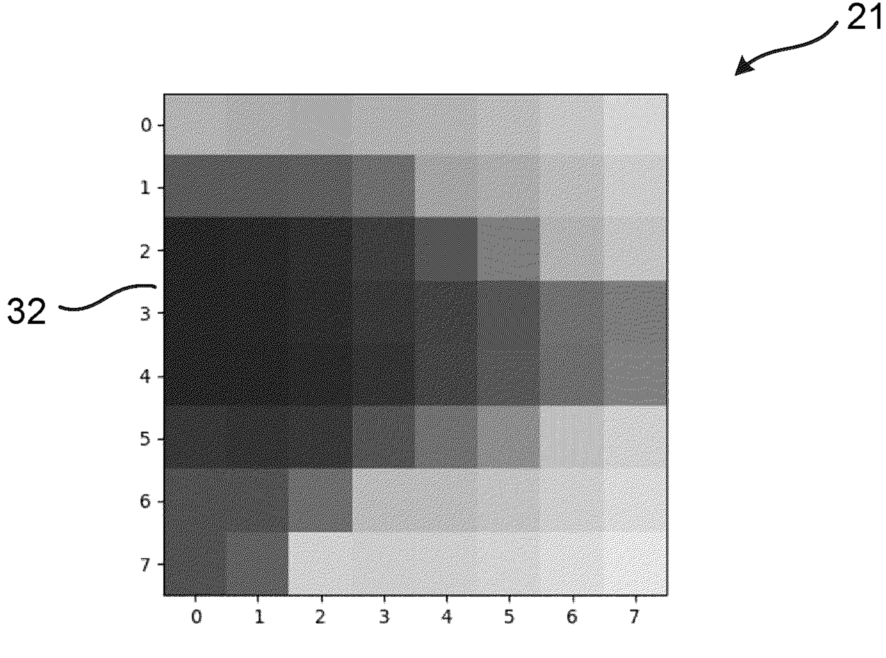

FIGS. 2A-B depict schematic images 20, 21 illustrating a situation when a single person passes through the doorway 5. The image 20 in FIG. 2A is captured using a first image source 11 being an 8×8 ToF sensor, i.e. 64 pixels. For each pixel, the shading indicates a distance from the sensor to the nearest object in that pixel. Darker shading indicates closer distance than lighter shading. In this example, the doorway is vertically in the middle, with an opening that is horizontal in the image.

Looking first to FIG. 2A, the darker shading in the middle left 30 of the image 20 indicates an object being closer to the sensor. The image 20 is captured when a person walks through the doorway.

Looking now to FIG. 2B, the image 21 is a result of the people detector 1 generating an image 21 by fitting a two-dimensional distribution function 31 to the image in FIG. 2A. It has been found that one two-dimensional distribution function that works well for this purpose is a two-dimensional distribution function. However, any suitable distribution function can be used. Comparing the generated image 21 in FIG. 2B with the captured image 20 in FIG. 2A, it can be seen that the images 20, 21 are not identical, but very similar.

Figure 3A:
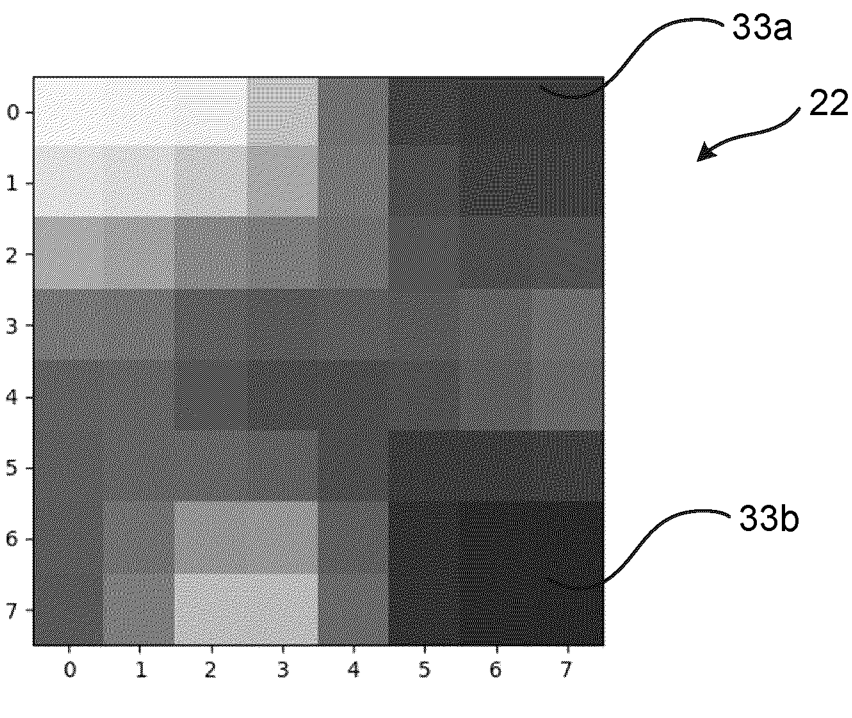
FIGS. 3A-B depict schematic images illustrating a situation when two people pass through the doorway of FIG. 1.
Figure 3B:
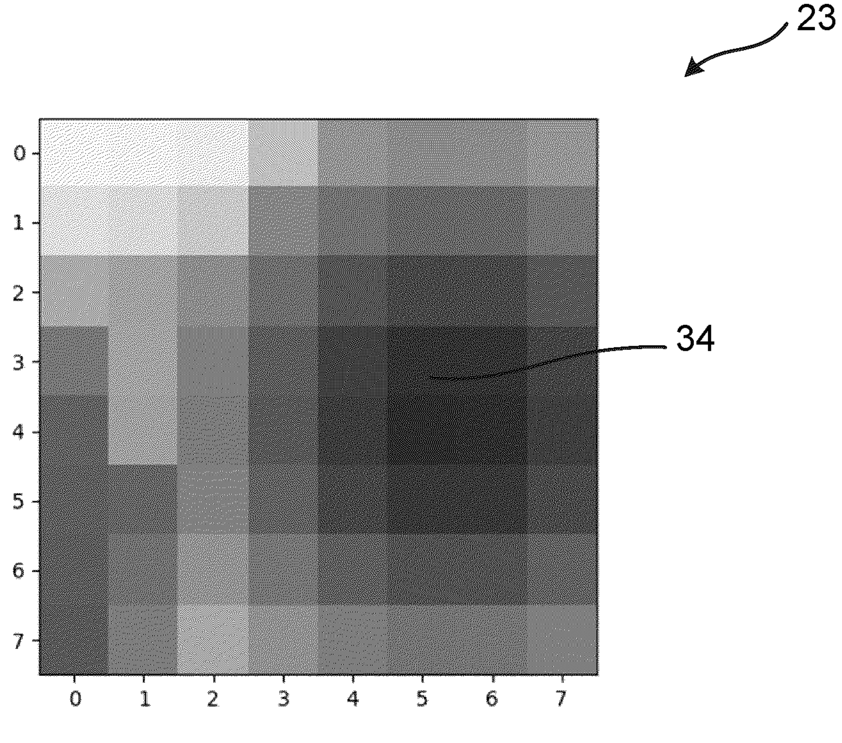

FIGS. 3A-B depict schematic images 22, 23 illustrating a situation when two people pass through the doorway. Similarly to FIG. 2A, the image in FIG. 3A is captured using the first image source 11 being an 8×8 ToF sensor, i.e. 64 pixels (as in FIG. 2A). Also here, for each pixel, the shading indicates a distance from the sensor to the nearest object in that pixel, and darker shading indicates closer distance than lighter shading.

Looking first to FIG. 3A, the darker shading 33*a* on the top right and the darker shading 33*b* on the bottom right of the image 22 indicates objects being closer to the sensor. In this example, the image 22 is captured when two people walk through the doorway, corresponding to the two sets of darker shading 33*a*, 33*b*. Hence, the two people are shown as two minima (in terms of distance from the sensor) in the image. The two minima are likely to be two people, whereby this is a clear indication of non-confidence that a single person passes through the doorway.

Looking now to FIG. 3B, in analogy with the image 21 of FIG. 2B, the image 23 is a result of the people detector 1 generating an image 23 by fitting a two-dimensional distribution (Gaussian in this example) function 34 to the image in FIG. 3A. Comparing the generated image 23 in FIG. 3B with the captured image 22 in FIG. 2A, it can be seen that the images 22, 23 are here quite different. This difference is due to the two people do not fit well with the (in the plane shown in the image 23) circular two-dimensional Gaussian function.

The scenarios in FIGS. 2A-B and FIGS. 3A-B illustrate how the inventors have realised that, by evaluating the difference between an originally captured image with an image based on a two-dimensional Gaussian function that has been fit to the original image, it can be reliably determined when a single person passes through the doorway. The difference can be calculated as a numeral (also denoted confidence indicator) and compared to a threshold value. When the difference is smaller than the threshold value, such as in the scenario of FIGS. 2A-B, it can be reliably determined that a single person passes through the doorway. On the other hand, when the difference is larger than the threshold, such as in the example of FIGS. 3A-B, more details are needed to determine if there is one or more people passing through the doorway.

FIGS. 4A-D depict schematic diagrams 25 illustrating scenarios where movement is consistent and inconsistent of someone passing through the doorway. The diagrams 25 are based on the same type of pictured mentioned above with reference to FIGS. 2A-B and FIGS. 3A-B. Here, however, each captured image has been evaluated to calculate the centre of mass 35 as a weighted average position in x-y dimension, based on closeness to the sensor. In this example, the doorway is vertically in the middle, with an opening that is horizontal in the image.

In FIG. 4A, the centre of mass 35 is in a position in the lower part of the diagram 25. The fact that the centre of mass 35, when it is first detected, is in the lowest part of the diagram 25 is already an indication of upward movement.

In FIG. 4B, which follows after FIG. 4A in time, the centre of mass 35 is slightly higher in the diagram 25, confirming the assumption that a person is walking upwards, to pass through the doorway.

The centre of mass is calculated for every captured image containing an object, object velocity can be approximated by dividing the difference of an object's centre of mass (see the distance between the centre of mass 35 in FIGS. 4A and 4B) between two frames with the time difference (i.e. the time difference between the images of FIGS. 4A and 4B). The object velocity can be linearly projected onto the passage direction, where a high vector magnitude would signify passage in one direction, and a high negative vector magnitude would signify passage in the opposite direction. These magnitudes are saved from every image containing the same object, and the consistency of movement can be evaluated from a metric such as the absolute mean value and unbiased estimated standard deviation of the magnitudes. A scenario with low absolute mean value and high standard deviation signifies inconsistent movement. Conversely, a high absolute mean value and low standard deviation signifies consistent movement. These values can be used image-wise as a metric of no-confidence. It is worth noting that if the sensor is mounted on the top of the door frame, without rotation, the y dimension of the image source is parallel to the passage direction, therefore the y-coordinate of the centre of mass can be used directly instead of applying linear projection.

After FIG. 4B, there are two scenarios.

In a first scenario, illustrated by FIG. 4C, which follows after FIG. 4B in time, the centre of mass 35 is in the upper part of the diagram 25, suggesting that a person continues walking upwards, passing through the doorway. This scenario is one of consistent movement.

In a second scenario (being alternative to the first scenario), illustrated by FIG. 4D, which follows after FIG. 4B in time, the centre of mass 35 is in the lower part of the diagram 25, indicating inconsistent movement of a person. This can be a case of the person returning back towards the bottom of the diagram 25. However, this inconsistent movement can also be due to a second person entering the field of view of the sensor, which results in the centre of mass being pulled downwards due to the presence of this second person.

It can thus be seen that when inconsistent movement occurs based on the first image source 11, this can be due to multiple persons passing through the doorway and it cannot be determined confidently that a single person passes through the doorway based on the first image source 11 alone. Consequently, when inconsistent movement is determined, the second image source 12 is employed to detect people more accurately, albeit at the cost of some more energy use.

Figure 5:
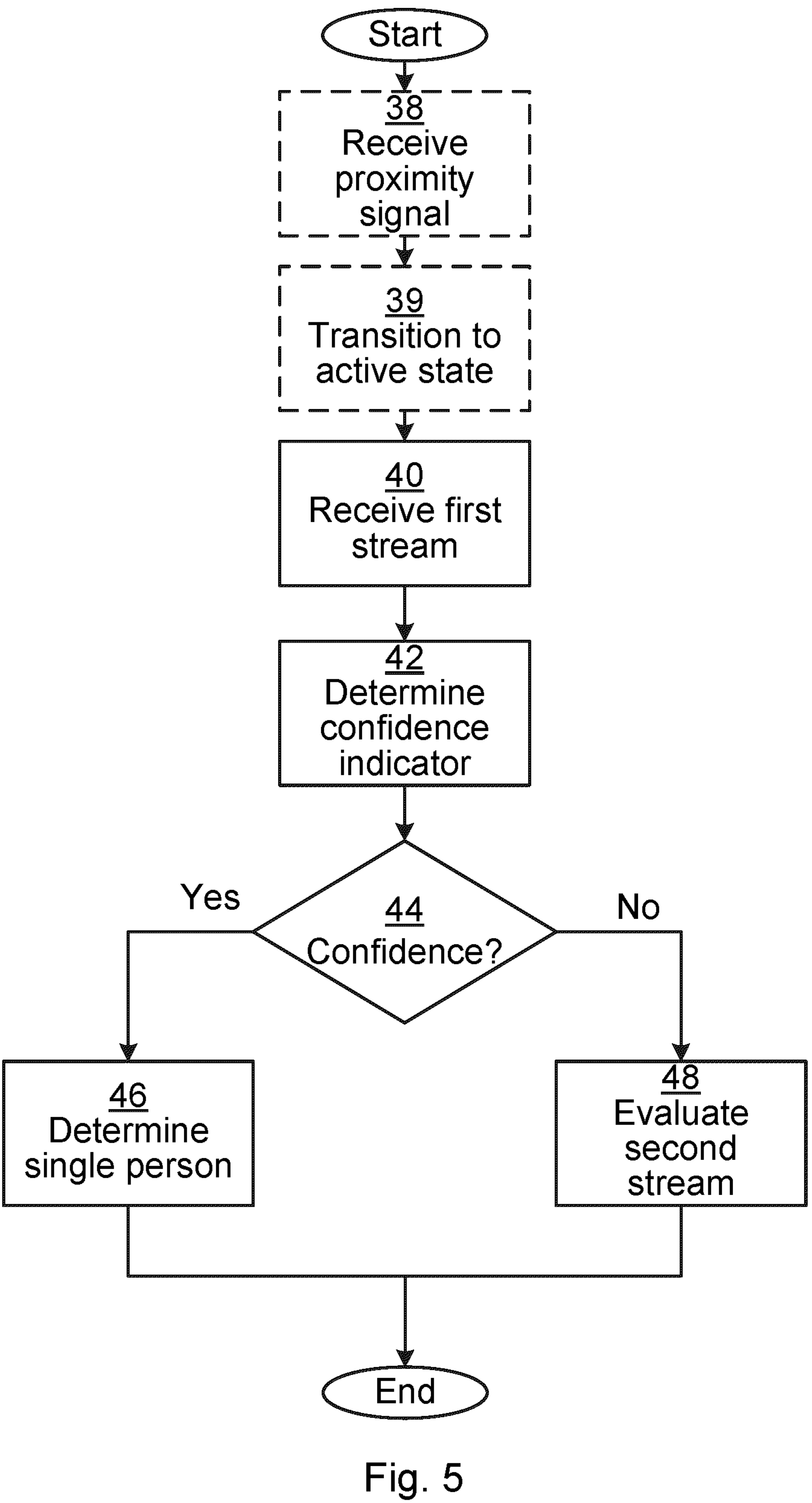
FIG. 5 is a flow chart illustrating methods for detecting when people pass through a doorway of a door by which a people detector is installed.

FIG. 5 is a flow chart illustrating methods for detecting when people pass through a doorway 5 of a door 15 by which a people detector 1 is installed. The method is performed by the people detector 1.

In an optional receive proximity signal step 38, the people detector receives a proximity signal indicating proximity of a person, e.g. from the proximity sensor mentioned above.

In an optional transition to active state step 39, the people detector transitions from a dormant state to an active state based on the proximity signal.

When steps 38 and 39 are performed, the people detector 1 is normally in a dormant (low power) mode, and is thus woken up by a signal from the proximity sensor detecting proximity of a person less than threshold distance. The proximity sensor can e.g. be an ultrasound sensor, a passive infrared sensor or a radar. The proximity sensor can be external to the proximity sensor 1 or form part of the proximity sensor.

In a receive first stream step 40, the people detector 1 receives a first stream of images from a first image source 11.

The first image source 11 can e.g. be a time-of-flight camera sensor, in which case each image in the first stream of images comprises a matrix of pixels, where each pixel comprises a depth value, as described with reference to FIGS. 2A and 3A above.

In one embodiment, the first image source comprises images from two sensors. In this case, the first stream of images is based on two sub-streams from the two sensors, respectively. The two sensors can be used to provide wider coverage for a wider doorway. In this embodiment, an overlapping field of view between the two sensors can be calculated. Objects detected in pixels in the overlapping area of the two sensors can be cross-checked, where a certain confidence threshold for both sensors must be met to classify the passage direction. Or, more intricately, a function of the two sensor confidences can be deployed to gather a combined confidence or non-confidence decision. Objects in the non-overlapping field of view are then evaluated independently, expanding the spatial coverage of the algorithm.

In one embodiment, one sensor is angled away slightly from the doorway, to avoid two head objects melting into one when two people walk close behind each other. Such an embodiment exploits the fact that it is more unlikely that the frame will be inconclusive in both sensors at the same time if one is slightly angled. Hence, the determination can be based on both streams to achieve greater confidence.

The two sub-streams can be combined in time domain in post processing, e.g. using any suitable interpolation procedure. Such an interpolation ensures that the data is in the same moment in time for both sub-streams.

In a determine confidence indicator step 42, the people detector 1 determines, based on the first stream of images, a confidence indicator that a single (i.e. one and only one) person passes through the doorway.

In one embodiment, the determining the confidence indicator comprises, for each image in the first stream of images where an object is detected, fitting a two-dimensional distribution function, and determining the confidence indicator based on how similar the two-dimensional distribution function is to the image. Optionally, for each image in the first stream of images, the people detector removes pixels that depict the door 15 prior to fitting the two-dimensional distribution function. The two-dimensional distribution function can be any convex two-dimensional distribution function, e.g. two-dimensional Gaussian function, Von Mises distribution, gamma distribution etc.

The fitting of the two-dimensional distribution function can be performed according to the following, for each image consisting of a matrix of pixels, where each pixel comprises depth data, e.g. as depicted in FIGS. 2A and 3A and explained above.

1: Check if a sufficient (greater than a threshold) number of pixels have captured an object, indicated by a depth being smaller than a threshold depth. If there are a sufficient number of pixels capturing an object, the procedure continues. Otherwise, the procedure ends.

2: Pixels capturing the door are removed. The determination of where the door is in the image can be based on image analysis or based on receiving a door status signal indicating opening status of the door. The image analysis can be based on analytical removal of the door based on a configured installation position, or based on a machine learning algorithm trained on various door positions with labelled desired results.

When a door status signal is used, this can be a signal capable of indicating fully open, closed and a plurality of different extents of opening between fully open and closed. For instance, the door status signal can be a state in an enumeration of potential states, e.g. an enumeration of degrees of opening such as {0, 15, 30, 45, 60, 75, 90}, where the closest match is selected. Alternative, the door status signal can be a numerical (integer or floating point) value indicating the degree of opening e.g. in the range of [0, 1], where 0 indicates closed and 1 indicates fully open, or [0, 180], where 0 indicates closed and 180 indicates 180 degrees of opening. It is to be noted that the examples of 90 degrees and 180 degrees of fully open door are only two examples and the embodiments presented herein can be applied for any value of degree for fully open. Alternatively, the door status signal is an analogue electrical signal. The degree metric is mainly applicable when the door is a swing door. For sliding doors or roller doors, the other types of metrics are more applicable.

3: With x, y being coordinates in the image, $x_0$, $y_0$, being centre location of the Gaussian function (or other distribution function), $\sigma$ being the standard deviation, and A being the amplitude, $x_0$, $y_0$, $\sigma$ and A are optimized so that the two-dimensional Gaussian function $f(x, y)$ is as close to the image data as possible, measured in mean squared error. $f(x, y)$ is expressed according to:

$$f(x, y) = A\exp\left(-\left(\frac{(x-x_0)^2}{2\sigma_X^2}\right)+\left(\frac{(y-y_0)^2}{2\sigma_Y^2}\right)\right) \tag{1}$$

One example of an optimization algorithm is scipy.curve_fit from the SciPy Community, and an example of a nonlinear least square solver is trf (trust region reflective solver). However, most known optimization algorithms will work for this task.

$x_0$, $y_0$ are bound between [0, N] where N is the image resolution in the dimension in question (8 in the examples described herein), amplitude A should be bound between [ε, L+ε] where Lis lowest depth recorded in the frame and ε is the interval length, which should be relatively small. σ can also be bound around a relatively small interval, e.g. corresponding to the variation of peoples' head shapes.

4: A normalized cross-correlation between the 2D gaussian and the image is calculated, and can be used as the confidence indicator that a single person passes through the doorway.

In one embodiment, for each image in the first stream of images, the people detector 1 determines a centre of mass, comparing a movement of the centre of mass from a previous image in the first stream of images, and determining the confidence indicator that a person passes through the doorway based on the movement. More specifically, the confidence indicator can be determined by determining that the confidence indicator indicates non-confidence when the centre of mass changes direction. The change of direction may need to sufficiently strong to be deemed to be inconsistent.

This procedure is now described in more detail.

1: Every image that has a connected group of objects (pixels that are low depth and neighbour each other) is saved into memory.
2: A value of intersection over union is calculated between new images and previous images. If the value is above a certain threshold, the images are linked with one another and saved as a tracked object.
3: The centre of mass (weighted average position in x-y dimension) for each image is calculated. If the centre of mass of the first image of a tracked object is in the upmost rows of the matrix of the image, it is assumed to be a downward passage direction, if it is in the bottom rows it is assumed to be an upward passage direction.
4: Object movement is calculated by comparing the centre of mass of the most recent image with that of the previous image. If this movement is not consistent with the assumed passage direction, the movement is deemed inconsistent.
5: A condition that the movement of N or more images need to be inconsistent with a previous image for the movement detected in the stream of images to be classified as inconsistent. In this embodiment, the confidence indicator that a person passes through the doorway can be the number of images with inconsistent movement.

In one embodiment, when each image in the first stream of images comprises depth data. The confidence indicator is determined to indicate non-confidence when there is more than one depth minimum in the first stream of image. Each depth minimum is then deemed to be one person. Since there are then two people detected, the confidence indicator that there is only one person passing through the doorway is set to non-confident.

In one embodiment, it is detected using the first stream of images is used to determine when it is likely that two people come from opposite directions and meet in the doorway, in which case the confidence indicator is determined to indicate non-confidence.

In a conditional confidence step 44, the people detector 1 evaluates the confidence indicator determined in step 42 against a threshold. The confidence can be lower e.g. when two people pass in close proximity (normally or piggybacking), if a person carrier a large backpack or rolling bag, or if a person has an umbrella up (a procedure commonly used to deceive camera-based overhead detectors). Hence there can be legitimate or illegitimate reasons for a reduced confidence.

When the two-dimensional Gaussian function is fitted and the normalized cross-correlation between the two-dimensional Gaussian function and the image is used as the confidence indicator, one example of a suitable threshold is 0.6. Hence, the confidence indicator indicates confidence that a single person passes through the doorway when the cross-correlation is greater than the threshold of 0.6. Otherwise, there is non-confidence. Other values are equally possible and can be adjusted based on real-life performance.

When inconsistent movement is used to determine confidence of a single person passing through the doorway, the number of images with inconsistent movement can be used to determine confidence. For instance, when the number of images with inconsistent movement is greater than a threshold, there is non-confidence that a single person walks through the doorway. Otherwise, there is confidence.

If the confidence indicator indicates confidence (e.g. based on the thresholds mentioned above) that a single person passes through the doorway, the method proceeds to a determine single person step 46. Otherwise, the method proceeds to an evaluate second stream step 48. The confidence is here to be construed as relative (not absolute) confidence, i.e. that confidence is based on the confidence indicator being on one side of a predetermined threshold.

In a determine single person step 46, the people detector 1 determines that a single person has passed through the doorway.

In an evaluate second stream step 48, the people detector 1 receives a second stream of images from the second image source 12 11. The second stream of images at least partly overlaps the first stream of images in time. Furthermore, the people detector 1 determines, based on the second stream of images, in a secondary detection, how many people has passed through the doorway. People detection based on the second stream of images consumes more energy than people detection based on the first stream of images by the second image source 12 having a greater resolution than the first image source 11. The people detection for the first stream of images comprises the determine confidence indicator step 42. The people detection for the second stream of images comprises the evaluate second stream step 48.

The secondary detection can be located locally in the people detector or using a remote server. The secondary detection can be based on machine learning and/or analytical rules.

It is to be noted that the receiving of the second stream can end before the first stream. Also, the second stream can be of a lower sampling rate than the first stream.

When piggybacking is determined or suspected, this can be reported to the external device.

The method can be repeated an arbitrarily number of times to keep track of the number of people that pass through the doorway over time.

Optionally, after a period of inactivity, e.g. defined as no person being detected in the vicinity of the people sensor 1 for a threshold amount of time, the people sensor 1 falls into a dormant state to save power.

Using embodiments presented herein, a people detector is provided that is very power efficient. This allows the people detector to be battery powered, which significantly simplifies installation. Moreover, the embodiments presented herein can be implemented using a simple, image sensors with relatively low resolution, saving cost and processing power.

More specifically, since the second stream of images is only received when the confidence indicator indicates non-confidence, and the second image source having a greater resolution than the first image source, both accuracy and power efficiency is achieved. The low-power primary detection is used when sufficiently accurate, and the high-power secondary detection is only used when needed. It is thus provided people detection that is both accurate and power efficient.

Figure 6:
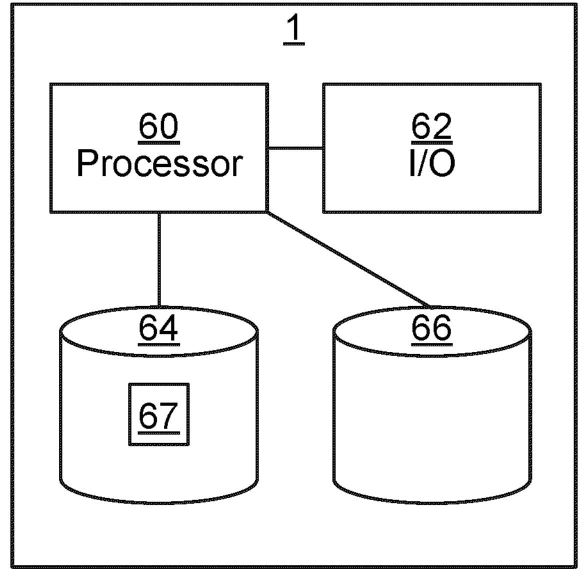
FIG. 6 is a schematic diagram illustrating components of the people detector of FIG. 1.

FIG. 6 is a schematic diagram illustrating components of the people detector 1 of FIG. 1. A processor 60 is provided using any combination of one or more of a suitable central processing unit (CPU), graphics processing unit (GPU), neural processing unit (NPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIG. 5 above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The people detector 1 further comprises an I/O interface 62 for communicating with external and/or internal entities. The I/O interface 62 comprises connections to the first image source 11 and the second image source 12. The first images source 11 and the second image source 12 can be external to the people detector 1 or can form part of the people detector 1 as shown in FIG. 1.

Other components of the people detector 1 are omitted in order not to obscure the concepts presented herein.

Figure 7:
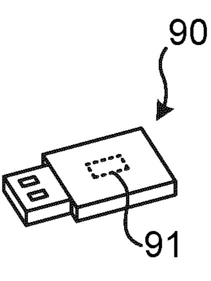
FIG. 7 shows one example of a computer program product comprising computer readable means.

FIG. 7 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 6. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

Here now follows a list of embodiments from another perspective, enumerated with roman numerals.

i. A people detector for detecting when people pass through a doorway of a door by which the people detector is installed, the people detector comprising:
  a first image source;
  a second image source;
  a processor; and
  a memory storing instructions that, when executed by the processor, cause the people detector to:
  receive a first stream of images from the first image source;
  determine, based on the first stream of images, a confidence indicator that a single person passes through the doorway;
  when the confidence indicator indicates confidence, determine that a single person has passed through the doorway; and
  when the confidence indicator indicates non-confidence, receive a second stream of images from the second image source, the second stream of images at least partly overlapping the first stream of images in time, and determine, based on the second stream of images, how many people has passed through the doorway, wherein people detection based on the second stream of images consumes more energy than people detection based on the first stream of images.

ii. The people detector according to embodiment i, wherein each image in the first stream of images comprises depth data, and wherein the instructions to determine the confidence indicator comprise instructions that, when executed by the processor, cause the people detector to, for each image in the first stream of images, fit a two-dimensional distribution function, and determine the confidence indicator based on how similar the two-dimensional distribution function is to the image.

iii. The people detector according to embodiment ii, wherein the instructions to determine the confidence indicator comprise instructions that, when executed by the processor, cause the people detector to, for each image in the first stream of images, remove pixels that depict the door prior to fitting the two-dimensional distribution function.

iv. The people detector according to embodiment ii or iii, wherein the first image source is a time-of-flight camera, and wherein each image in the first stream of images comprises a matrix of pixels, where each pixel comprises a depth value.

v. The people detector according to any one of the preceding embodiments, wherein the instructions to determine the confidence indicator comprise instructions that, when executed by the processor, cause the people detector to, for each image in the first stream of images, determine a centre of mass, compare a movement of the centre of mass from a previous image in the first stream of images, and determine the confidence indicator based on the movement.

vi. The people detector according to embodiment v, wherein the instructions to determine the confidence indicator comprise instructions that, when executed by the processor, cause the people detector to determine that the confidence indicator indicates non-confidence when the centre of mass changes direction.

vii. The people detector according to any one of the preceding embodiments, wherein the instructions to determine the confidence indicator comprise instructions that, when executed by the processor, cause the people detector to determine that the confidence indicator indicates non-confidence when there is more than one depth minimum in the first stream of image.

viii. The people detector according to any one of the preceding embodiments, wherein the first image source comprises images from two sensors, and wherein the first stream of images is based on two sub-streams from the two sensors, respectively.

ix. The people detector according to any one of the preceding embodiments, wherein the people detector is configured to transition from a dormant state to an active state based on receiving a signal indicating proximity of a person.

x. A method for detecting when people pass through a doorway of a door by which a people detector is installed, the method is performed by a people detector, the method comprising:
  receiving a first stream of images from a first image source;
  determining, based on the first stream of images, a confidence indicator that a single person passing through the doorway;

when the confidence indicator indicates confidence, determining that a single person has passed through the doorway; and when the confidence indicator indicates non-confidence, receiving a second stream of images from the second image source, the second stream of images at least partly overlapping the first stream of images in time, and determine, based on the second stream of images, how many people has passed through the doorway, wherein people detection based on the second stream of images consumes more energy than people detection based on the first stream of images.

xi. The method according to embodiment x, wherein each image in the first stream of images comprises depth data, and wherein the determining the confidence indicator comprises, for each image in the first stream of images, fitting a two-dimensional distribution function, and determining the confidence indicator based on how similar the two-dimensional distribution function is to the image.

xii. The method according to embodiment xi, wherein, the determining the confidence indicator comprises, for each image in the first stream of images, removing pixels that depict the door prior to fitting the two-dimensional distribution function.

xiii. The method according to embodiment xi or xii, wherein the first image source is a time-of-flight camera, and wherein each image in the first stream of images comprises a matrix of pixels, where each pixel comprises a depth value.

xiv. The method according to any one of embodiments x to xiii, wherein the determining the confidence indicator comprises, for each image in the first stream of images, determining a centre of mass, comparing a movement of the centre of mass from a previous image in the first stream of images, and determining the confidence indicator based on the movement.

xv. The method according to embodiment xiv, wherein the determining the confidence indicator comprises determining that the confidence indicator indicates non-confidence when the centre of mass changes direction.

xvi. The method according to any one of embodiments x to xv, wherein each image in the first stream of images comprises depth data, and wherein the determining the confidence indicator comprises determining that the confidence indicator indicates non-confidence when there is more than one depth minimum in the first stream of image.

xvii. The method according to any one of embodiments x to xvi, wherein the first image source comprises images from two sensors, and wherein the first stream of images is based on two sub-streams from the two sensors, respectively.

xviii. The method according to any one of embodiments x to xvii, further comprising:

receiving a proximity signal indicating proximity of a person; and transitioning from a dormant state to an active state based on the proximity signal.

xix. A computer program for detecting when people pass through a doorway of a door by which a people detector is installed, the computer program comprising computer program code which, when executed on the people detector causes the people detector to:

receive a first stream of images from a first image source;

determine, based on the first stream of images, a confidence indicator that a single person passing through the doorway;

when the confidence indicator indicates confidence is greater than a threshold, determine that a single person has passed through the doorway; and when the confidence indicator indicates non-confidence is less than the threshold, receive a second stream of images from the second image source, the second stream of images at least partly overlapping the first stream of images in time, and determine, based on the second stream of images, how many people has passed through the doorway, wherein people detection based on the second stream of images consumes more energy than people detection based on the first stream of images.

xx. A computer program product comprising a computer program according to embodiment xix and a computer readable means comprising non-transitory memory in which the computer program is stored.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A people detector for detecting people passing through a doorway of a door by which the people detector is installed, the people detector comprising:

a first image source;

a second image source;

a processor; and a memory storing instructions that, when executed by the processor, cause the people detector to:

receive a first stream of images of a space by the doorway from the first image source;

determine, based on the first stream of images, a confidence indicator that a single person passes through the doorway;

in response to the confidence indicator indicating confidence, determine that a single person has passed through the doorway; and in response to the confidence indicator indicating non-confidence, receive a second stream of images of the space by the doorway from the second image source, the second stream of images at least partly overlapping the first stream of images in time, and determine, based on the second stream of images, how many people have passed through the doorway, wherein people detection based on the second stream of images consumes more energy than people detection based on the first stream of images by the second image source having a greater resolution of pixels than the first image source;

wherein each image in the first stream of images comprises a matrix of pixels, wherein each pixel comprises a depth value, and wherein the instructions to determine the confidence indicator comprise instructions that, when executed by the processor, cause the people detector to, for each image in the first stream of images, fit a two-dimensional distribution function, and determine the confidence indicator based on how similar the two-dimensional distribution function is to the image.

2. The people detector according to claim 1, wherein the instructions to determine the confidence indicator comprise instructions that, when executed by the processor, cause the people detector to, for each image in the first stream of images, remove pixels that depict the door prior to fitting the two-dimensional distribution function.

3. The people detector according to claim 1, wherein the first image source is a time-of-flight camera.

4. The people detector according to claim 1, wherein the instructions to determine the confidence indicator comprise instructions that, when executed by the processor, cause the people detector to, for each image in the first stream of images, determine a center of mass, compare a movement of the center of mass from a previous image in the first stream of images, and determine the confidence indicator based on the movement.

5. The people detector according to claim 4, wherein the instructions to determine the confidence indicator comprise instructions that, when executed by the processor, cause the people detector to determine that the confidence indicator indicates non-confidence in response to the center of mass changing direction.

6. The people detector according to claim 1, wherein the instructions to determine the confidence indicator comprise instructions that, when executed by the processor, cause the people detector to determine that the confidence indicator indicates non-confidence in response to there being more than one depth minimum in the first stream of images.

7. The people detector according to claim 1, wherein the first image source comprises images from two sensors, and wherein the first stream of images is based on two sub-streams from the two sensors, respectively.

8. The people detector according to claim 1, wherein the people detector is configured to transition from a dormant state to an active state based on receiving a signal indicating proximity of a person.

9. A method for detecting people passing through a doorway of a door by which a people detector is installed, the method performed by a people detector, the method comprising:

receiving a first stream of images of a space by the doorway from a first image source;

determining, based on the first stream of images, a confidence indicator that a single person passing through the doorway; and at least one of:

in response to the confidence indicator indicating confidence, determining that a single person has passed through the doorway; and in response to the confidence indicator indicating non-confidence, receiving a second stream of images of the space by the doorway from the second image source, the second stream of images at least partly overlapping the first stream of images in time, and determine, based on the second stream of images, how many people have passed through the doorway, wherein people detection based on the second stream of images consumes more energy than people detection based on the first stream of images by the second image source having a greater resolution of pixels than the first image source;

wherein each image in the first stream of images comprises a matrix of pixels, wherein each pixel comprises a depth value, and the determining the confidence indicator comprises, for each image in the first stream of images, fitting a two-dimensional distribution function, and determining the confidence indicator based on how similar the two-dimensional distribution function is to the image.

10. The method according to claim 9, wherein the determining the confidence indicator comprises, for each image in the first stream of images, removing pixels that depict the door prior to fitting the two-dimensional distribution function.

11. The method according to claim 9, wherein the first image source is a time-of-flight camera.

12. The method according to claim 9, wherein the determining the confidence indicator comprises, for each image in the first stream of images, determining a center of mass, comparing a movement of the center of mass from a previous image in the first stream of images, and determining the confidence indicator based on the movement.

13. The method according to claim 12, wherein the determining the confidence indicator comprises determining that the confidence indicator indicates non-confidence in response to the center of mass changing direction.

14. The method according to claim 9, wherein each image in the first stream of images comprises depth data, and wherein the determining the confidence indicator comprises determining that the confidence indicator indicates non-confidence in response to there being more than one depth minimum in the first stream of images.

15. The method according to claim 9, wherein the first image source comprises images from two sensors, and wherein the first stream of images is based on two sub-streams from the two sensors, respectively.

16. The method according to claim 9, further comprising:

receiving a proximity signal indicating proximity of a person; and transitioning from a dormant state to an active state based on the proximity signal.

17. A non-transitory computer readable medium storing a computer program for detecting people passing through a doorway of a door by which a people detector is installed, the computer program comprising computer program code which, when executed on the people detector, causes the people detector to:

receive a first stream of images of a space by the doorway from a first image source;

determine, based on the first stream of images, a confidence indicator that a single person passing through the doorway;

in response to the confidence indicator indicating confidence is greater than a threshold, determine that a single person has passed through the doorway; and in response to the confidence indicator indicating confidence is less than the threshold, receive a second stream of images of the space by the doorway from the second image source, the second stream of images at least partly overlapping the first stream of images in time, and determine, based on the second stream of images, how many people have passed through the doorway, wherein people detection based on the second stream of images consumes more energy than people detection based on the first stream of images by the second image source having a greater resolution of pixels than the first image source;

wherein each image in the first stream of images comprises a matrix of pixels, wherein each pixel comprises a depth value, and the program code to determine the confidence indicator comprises program code to, for each image in the first stream of images, fit a two-dimensional distribution function, and determining the confidence indicator based on how similar the two-dimensional distribution function is to the image.

* * * * *